US008783754B1

(12) United States Patent
Peterson et al.

(10) Patent No.: US 8,783,754 B1
(45) Date of Patent: Jul. 22, 2014

(54) VEHICLE HAVING UTILITY BED AND RETRACTABLE SEAT

(71) Applicants: Michael Vincent Peterson, Marysville, OH (US); Darin D. King, Raymond, OH (US)

(72) Inventors: Michael Vincent Peterson, Marysville, OH (US); Darin D. King, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/753,822

(22) Filed: Jan. 30, 2013

(51) Int. Cl.
*B60N 2/32* (2006.01)
*B60N 2/30* (2006.01)
(52) U.S. Cl.
CPC .................................. *B60N 2/3011* (2013.01)
USPC ............................................... 296/66; 296/69
(58) Field of Classification Search
USPC ......... 296/66, 67, 69, 39.1, 39.2, 184, 193.07
See application file for complete search history.

(56) References Cited

U.S. PATENT DOCUMENTS

| 5,979,964 | A | 11/1999 | Ban |
| 6,347,834 | B1 | 2/2002 | Couasnon |
| 6,455,948 | B1 | 9/2002 | Berger |
| 6,464,297 | B2 | 10/2002 | Garrido et al. |
| 6,666,512 | B1 | 12/2003 | Timon |
| 7,891,737 | B2 | 2/2011 | Mather |
| 8,002,331 | B2 | 8/2011 | Bowers |
| 8,075,040 | B2 | 12/2011 | Arnold |
| 2009/0243357 | A1* | 10/2009 | Mori et al. .................. 297/325 |
| 2010/0213733 | A1 | 8/2010 | Stark |

\* cited by examiner

*Primary Examiner* — Dennis H Pedder
*Assistant Examiner* — Beverly Becker
(74) *Attorney, Agent, or Firm* — Fay Sharpe LLP (57) ABSTRACT

An MUV having a utility bed including a bed floor having at least one panel. The bed floor panel is convertible between a planar storage surface and at least one passenger seat back by displacement of a lever. The bed floor being devoid of a latch handle.

20 Claims, 8 Drawing Sheets

VEHICLE HAVING UTILITY BED AND RETRACTABLE SEAT

BACKGROUND

The present exemplary embodiment relates to a vehicle having a utility bed containing a retractable seat. It finds particular application in conjunction with a vehicle having a utility bed seat actuated by a seat release lever remote from a cargo storage surface.

A MUV (Multi Utility Vehicle) is commonly known as a seat type vehicle capable of driving over rough terrain or the like. A vehicle of this type is equipped with a body cover. The body cover includes a front portion having left and right tire housings, a center portion extending rearward from a lower front region, and a rear portion constituting a cabin. The rear portion includes a floor panel portion on which the feet of a seated occupant can be placed.

A utility bed can be provided rearward of the vehicle cabin as shown in U.S. Pat. No. 6,075,040. This patent describes several features of an MUV common with the present disclosure and is therefore herein incorporated by reference.

Figure 1:
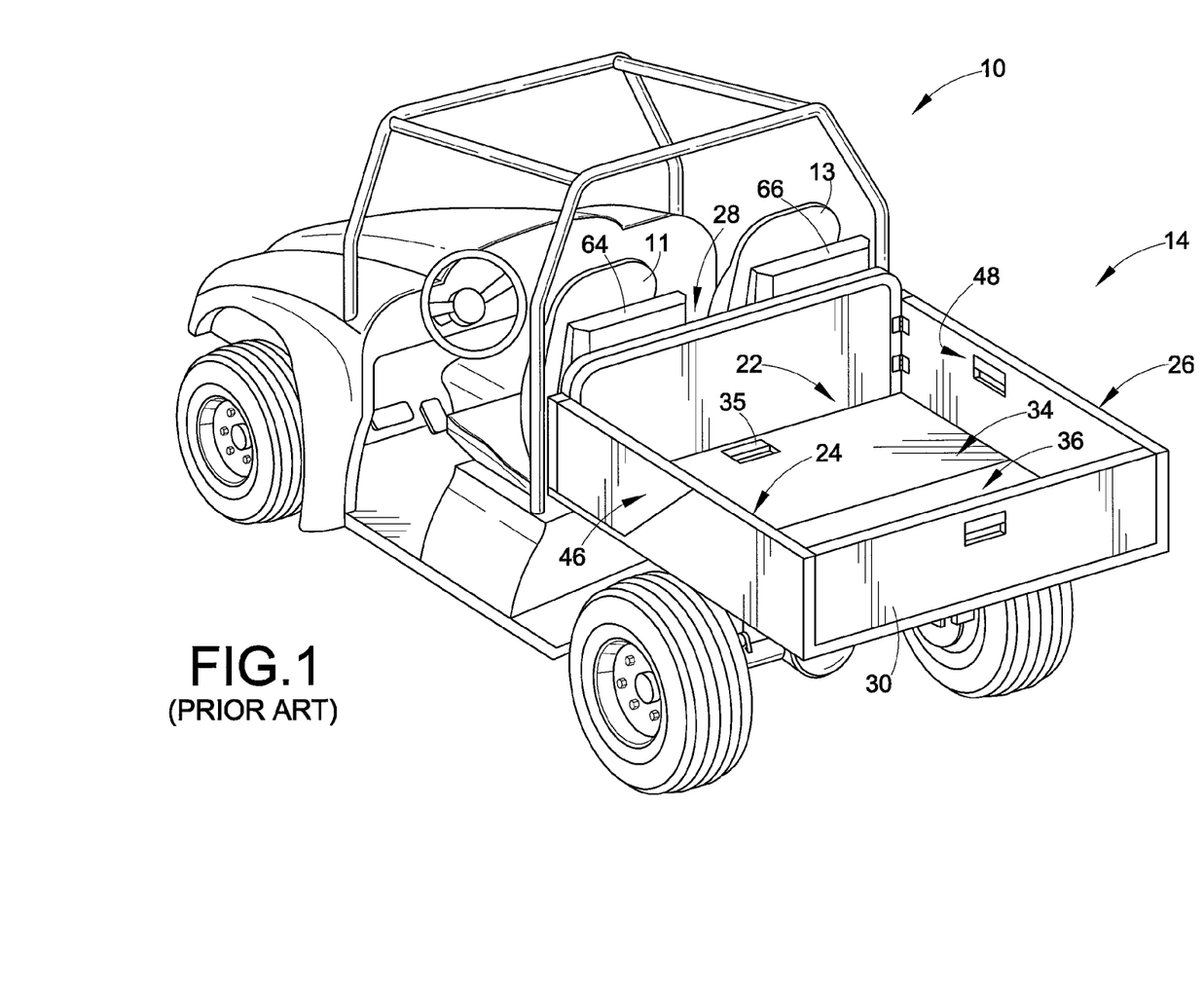
FIG. 1 is a perspective view of a prior art MUV in a closed utility floor condition.
Figure 2:
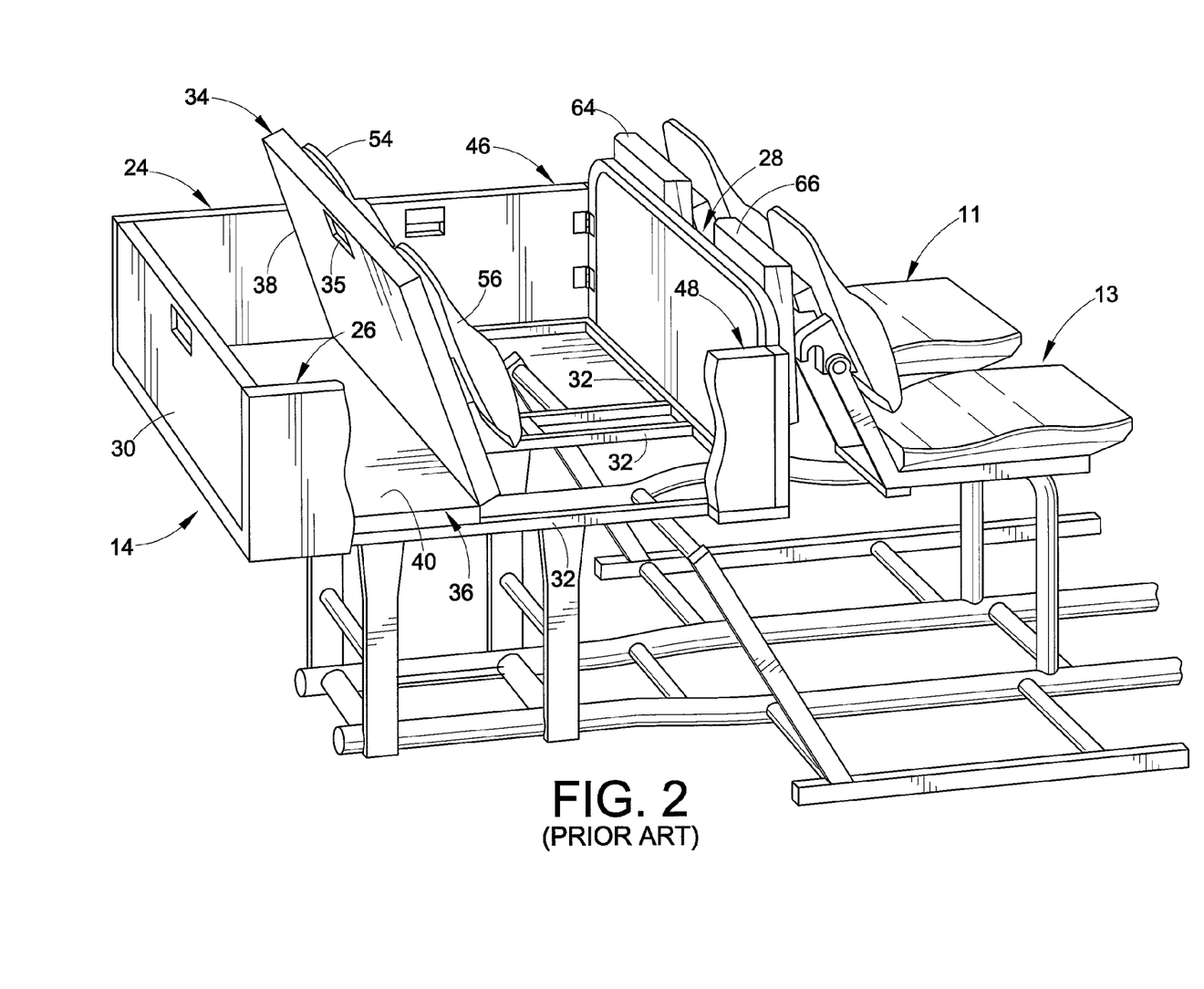
FIG. 2 is a perspective view of the MUV of FIG. 1 with a rear seat deployed.

In the embodiment of FIGS. 1 and 2, the MUV utility bed 14 is shown to comprise a bed floor 22. The utility bed 14 further includes a left side wall 24 and a right side wall 26 extending generally perpendicular from the bed floor 22. The utility bed 14 also includes front wall 28 and a tailgate 30. The tailgate 30 can be pivotally coupled with respect to the bed floor 22. When the utility bed 14 is in a hauling position, the left side wall 24, the right side wall 26, the front wall 28, and the tailgate 30 can cooperate with the bed floor 22 to retain cargo within the utility bed 14. The tailgate 30 can be selectively opened to facilitate loading/unloading of the utility bed 14 and/or to allow cargo (e.g., dirt) to pour from the utility bed 14 if the vehicle is outfitted with a dumping mechanism.

In another embodiment, it will be appreciated that a rear wall can be provided in lieu of a tailgate with the rear wall being rigidly affixed with respect to a bed floor such that it might not be capable of being selectively opened. In yet another alternative embodiment, it will be appreciated that one or more side walls of the utility bed might be capable of being selectively opened. In still another alternative embodiment, it will be appreciated that a utility bed might not include any tailgate and/or side walls and might, for example, comprise a flat-bed type configuration.

The MUV can include a frame 32 configured to provide underlying and structural support for certain components of the utility bed 14, specifically, and/or, the MUV, generally. The frame can comprise a tubular frame structure that extends along a perimeter and underneath the bed floor 22 and provides underlying support for the bed floor 22, the left and right side walls 24, 26, and/or the front wall 28. It will be appreciated however that a frame can be provided in any of a variety of suitable alternative arrangements.

The front floor 34 of the utility bed 14 can define a front cargo support surface 38 and the rear floor 36 can define a rear cargo support surface 40. When the front floor 34 is in the cargo support condition, the front cargo support surface 38 and the rear cargo support surface 40 can cooperate to define a substantially coplanar support surface that is configured to directly contact and provide underlying support for cargo (not shown) disposed within the utility bed 14.

The front floor 34 is shown to rest upon the frame 32 when the front floor 34 is in a floor closed condition. The front floor 34 is also shown to include a latch 35 that facilitates selective securement of the front floor 34 to the frame 32.

Activating latch 35 allows the front floor 34 to be moved to an upright position to reveal the left seat back 54 and the right seat back 56. The front wall 28 can be pivoted to move the left and right seat bottoms 64, 66 into a substantially horizontal position. In such an arrangement, the left and right seat backs 54, 56 can respectively cooperate with the left and right seat bottoms 64, 66 to define a left rear seat and a right rear seat. Additionally, left and right openings in side walls 24, 26 are closed by the left and right doors 46, 48 and can facilitate the ingress/egress of a passenger to/from the left and right rear seats. When the front floor 34 is in the cargo support condition with the front wall 28 in the erected position, the left and right seat backs 54, 56 are concealed beneath the utility bed and the left and right seat bottoms 64, 66 stowed behind the left and right front seats 11, 13.

One shortcoming with this design is that when utility bed 14 is used for cargo such as dirt or sand, the latch 35 becomes filled therewith and proves difficult to operate.

BRIEF DESCRIPTION

According to one embodiment, a vehicle having a utility bed including a bed floor is provided. The bed floor is constructed of a cover panel, a seat back panel and a seat bottom panel. The cover panel and the seat back panel each include a cam element. A slidable lever including at least two cam engaging members is also provided. Activation of the slidable lever causes the cam engaging members to engage the cam elements and raise an edge of the cover panel adjacent the seat back panel and an edge of the seat back panel adjacent the seat bottom panel. The raised edge of the seat back panel can be rotated to a position where the seat back panel has an at least generally vertical orientation. The seat bottom panel can be moved into a seat forming orientation with the seat back panel.

According to a further embodiment, an MUV having a utility bed is provided. The utility bed comprises a bed floor including a panel that is convertible between a planar storage surface and at least one passenger seat back by displacement of a latch. The bed floor is devoid of a latch and lever handle.

According to an additional embodiment, an MUV having a utility bed including a bed floor comprised of at least one panel is provided. The panel has an at least substantially planar side and an opposed first cam element inclusive side. A slidable lever is disposed externally to the utility bed and adjacent the at least one panel. The lever includes a second cam element cooperative with the first cam element to displace an edge of the panel from alignment with the bed floor. The edge of the panel is rotatable to position the panel in an at least substantially vertical orientation.

DETAILED DESCRIPTION

It should be noted that in this disclosure up, down, front, rear, left and right sides or directions refer to the point of view of the driver when seated during normal operation of the vehicle. In addition, many aspects of the MUV described in FIGS. 1 and 2 are supportive of the present embodiment and therefore form a portion of this description.

Figure 3:
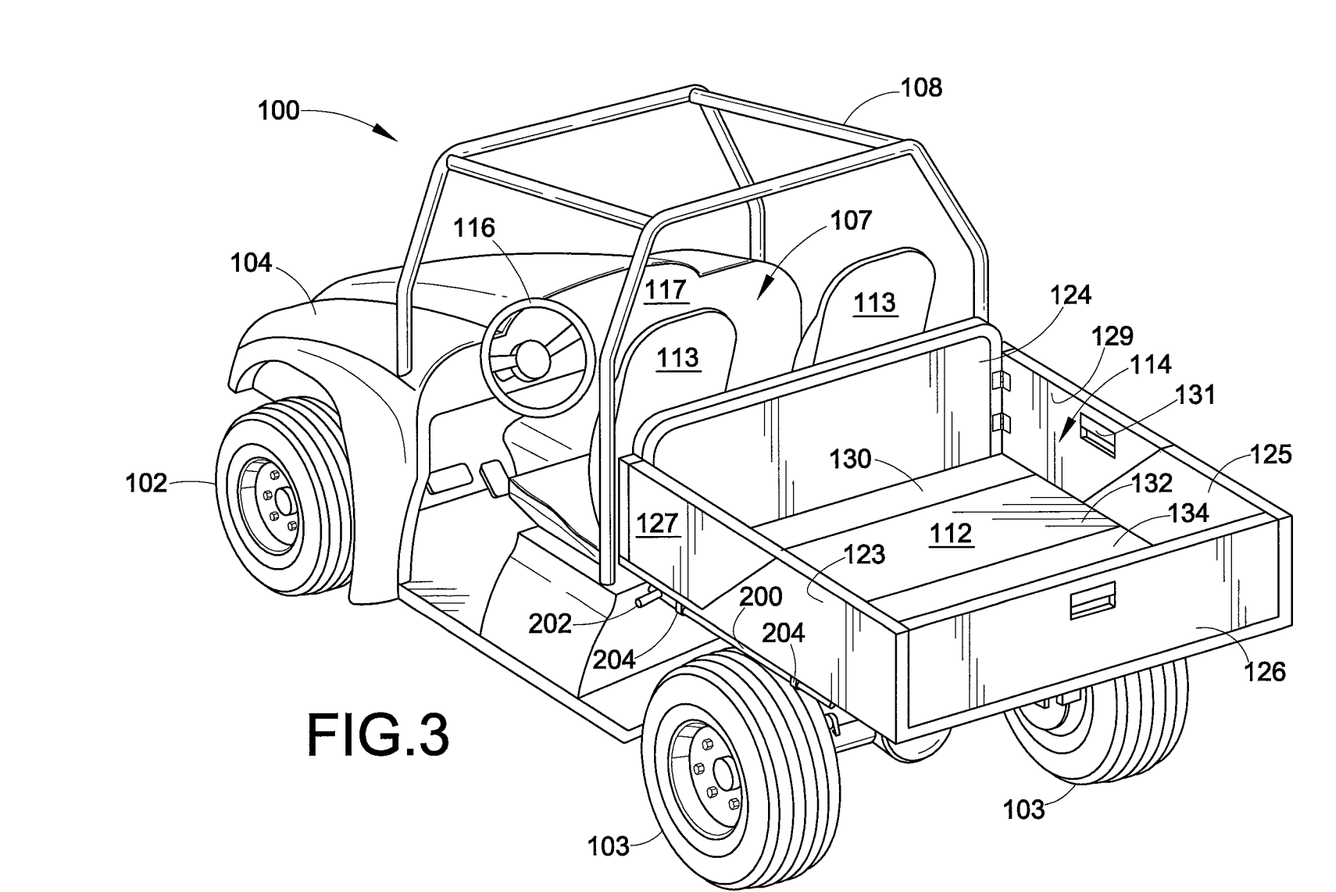
FIG. 3 is a perspective view of an MUV in accord with an embodiment of the present disclosure in a floor closed condition.
Figure 4:
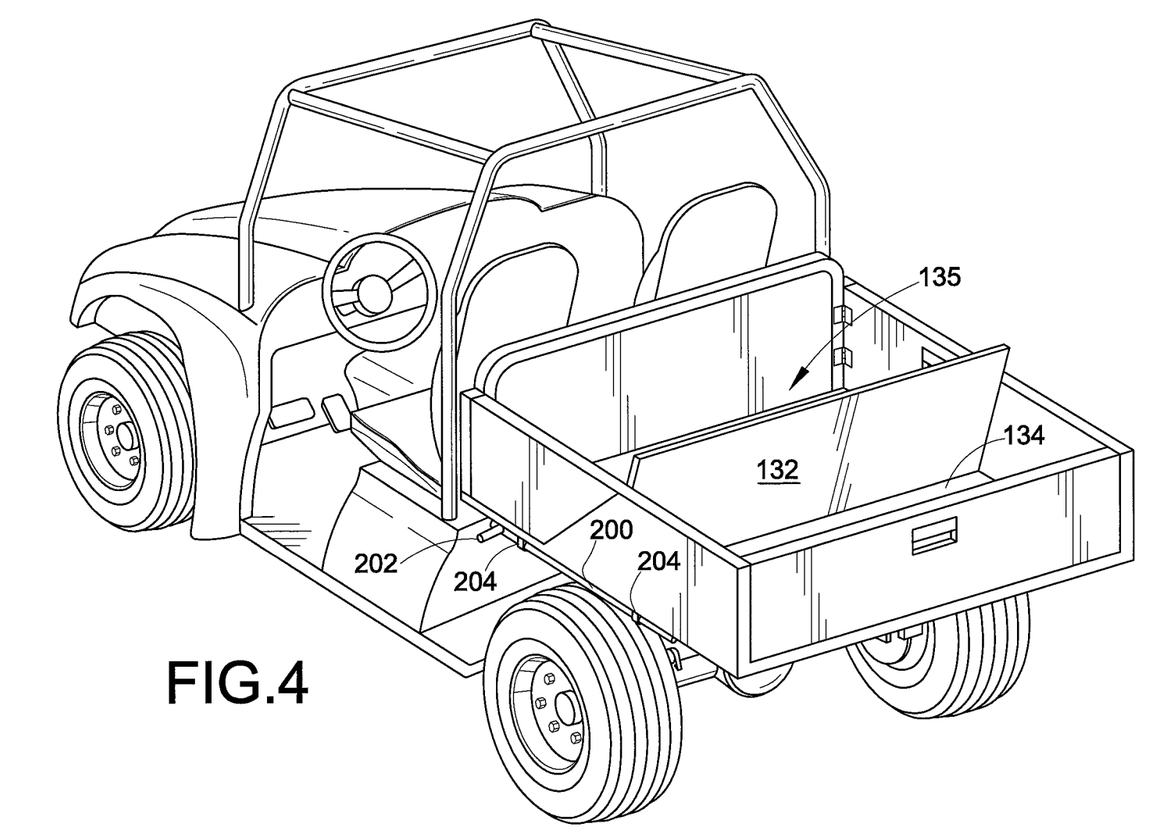
FIG. 4 is a perspective view of the MUV of FIG. 3 in a rear seat deployed condition.
Figure 5:
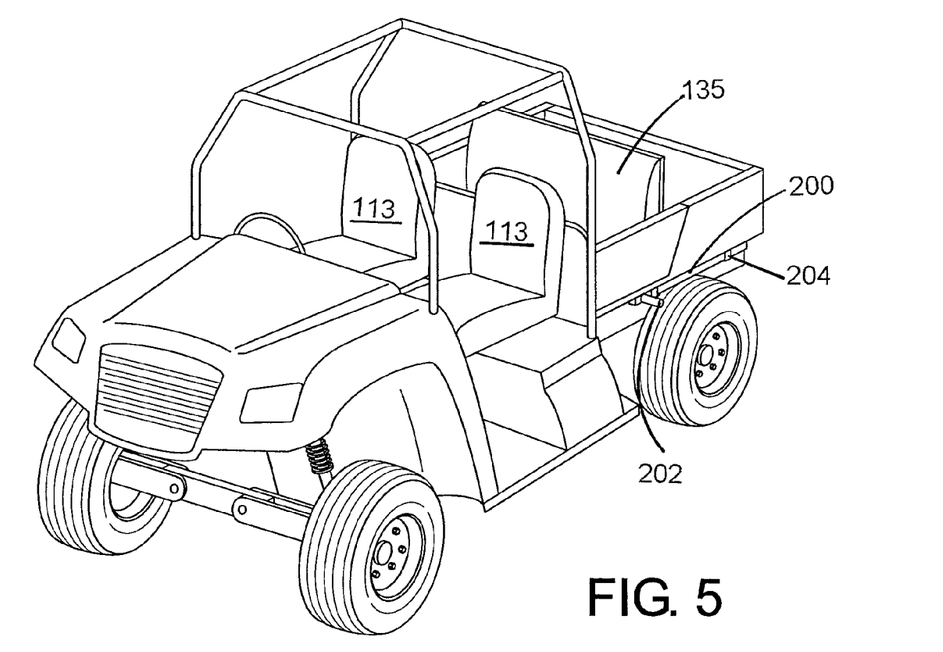
FIG. 5 is a front perspective view of the MUV of FIG. 4.
Figure 6:
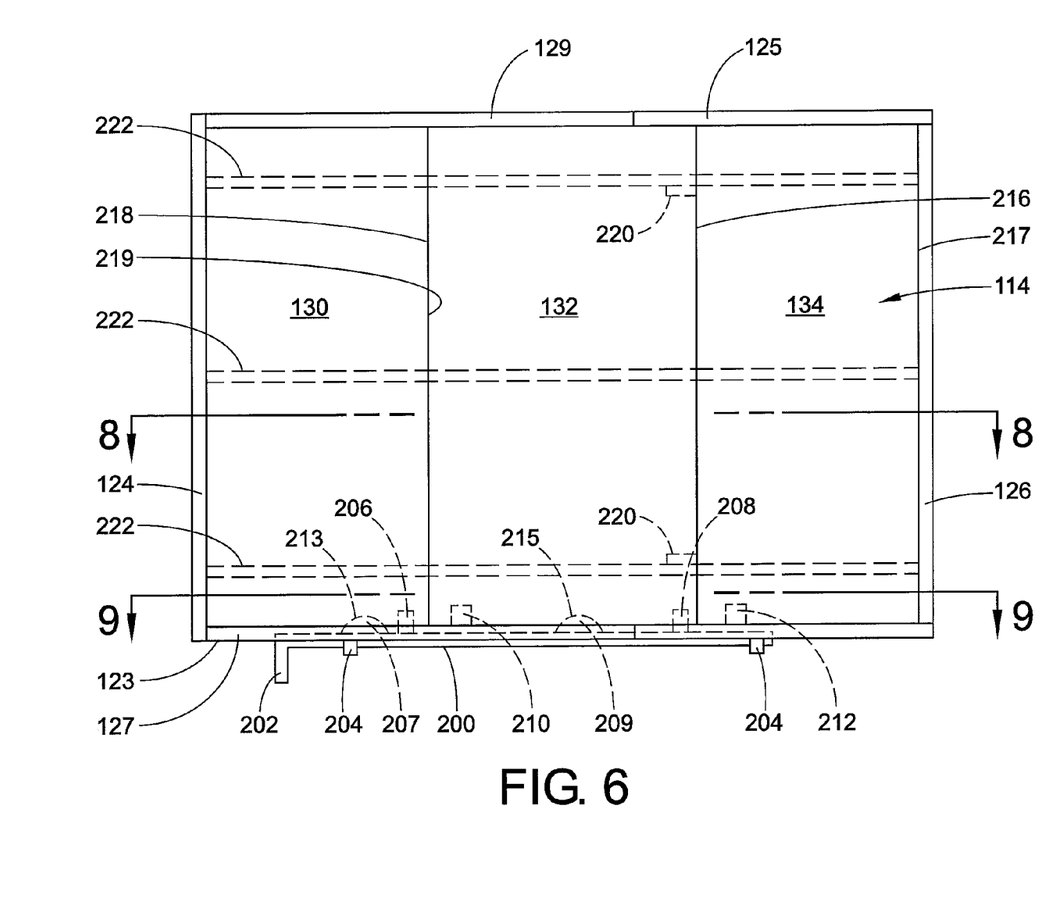
FIG. 6 is a plan view (partially in phantom) of the utility floor of FIG. 3.

Referring now to FIGS. 3-5, an MUV 100 is depicted. MUV 100 is a four-wheel vehicle capable of driving over rough terrain or the like and has two front wheels 102 and two rear wheels 103. On the front portion of the vehicle 100, there is provided a body cover 104 that covers a power plant, and forms a cabin 107. Cabin 107 is surrounded by a roll bar 108.

The cabin 107 is provided with two occupant seats 113 (which may be a bench seat as well) respectively arranged on the driver's side and on the passenger side. A steering wheel 116 is positioned in front of the driver's seat. An instrument panel 117 is located further forward with respect to the steering wheel 116.

A utility bed 114 is provided in the rear portion of the vehicle 100. Optionally, the front end portion of the utility bed 114 can be lifted upward about a rotary shaft to provide a lift type device.

The utility bed 114 includes a load-carrying platform 112 configured to directly contact and provide underlying support for cargo (not shown) disposed within the utility bed 114. The utility bed 114 is also shown to include multiple side walls 123, 124, and 125 extending generally perpendicularly from the load-carrying platform 112. Walls 123 and 125 can be provided with passageways sealed by doors 127 and 129, respectively, selectively opened and closed by handles 131.

A tailgate 126 can also be pivotally coupled to the bed floor 112 (or optionally the side walls). When the utility bed is in a hauling position, it will be appreciated that the side walls 123, 124, and 125 can cooperate with tailgate 126 and the load-carrying platform 112 to retain cargo within the utility bed 114. It will be appreciated that the tailgate 126 can be selectively opened to facilitate loading/unloading of the utility bed 114.

The load carrying platform 112 defines one or more apertures which can selectively facilitate access to one or more seat assemblies. The apertures in the load-carrying platform 112 are closed by a seat bottom panel 130, a seat back panel 132, and a cover panel 134.

An actuation mechanism is provided for conversion of the seat bottom panel 130, the seat back panel 132, and the cover panel 134 into a passenger seat 135 in the utility bed 114. Particularly, an elongated lever 200 is provided having a handle end 202 extending tangentially from the vehicle 100. Elongated lever 200 can be retained on the vehicle side wall 123 (or attached to the vehicle frame), as appropriate, via guides, channels, brackets 204 or other mechanism known to the skilled artisan to allow a front to back sliding motion of the lever 200. Of course, a back to front sliding mechanism, or even an outward sliding mechanism can also achieve the objective of the present invention with suitable orientation of the elements discussed below.

Referring now in addition to FIGS. 6-11, a body frame includes three longitudinally extending frame members 222 supporting the utility bed 114. The frame members 222 can be fixed to other lower frame members and/or the front portion of the vehicle. For example, the upper frame members 222 can be located above lower frame members and supported by vertically extending side frames (such as brackets) to form a substantially lattice-like configuration (see the frame of FIG. 2).

Lever 200 is provided with two cam engaging pins 206 and 208. Pins 206 and 208 are positioned to engage seat back panel cam element 210 and cover panel cam element 212. In addition, it is contemplated that the cam surfaces can be located on the lever and the pins located on the panels. Pin 208 can be positioned closer to the cam element 212 in a cargo supporting floor condition than pin 206 is positioned relative to cam element 210. For example, if pin 208 is a distance "X" from cam element 212, pin 206 can be a distance 3X from cam element 210 in a closed floor condition. A distance of 5X to 10X may also be advantageous.

In this manner, the rearward travel of lever 200 causes a first engagement of pin 208 with cam element 212 and a lifting of cover panel 134 forward edge 216 providing a space to facilitate subsequent rotation of seat back panel 132. Cover panel 134 can be secured to the frame 222 at or near its rearward edge 217.

Subsequent or simultaneously to initial raising of cover panel forward edge 216, pin 206 engages cam element 210 causing the lifting of seat back panel 132 forward edge 218, allowing the operator to grasp the forward edge 218 and complete the lifting and pivoting of seat back panel 132 about hinges 220 secured to vehicle frame 222 and into an at least generally vertical orientation to function as a seat back. Accordingly, it is desirable for handle 202 to be within arms length (e.g. 3 ft.) of panel 132. As used herein, generally vertical orientation includes the typical backwards incline associated with seating structures.

Lever 208 is further provided with retaining projections 207 and 209. Projections 207 and 209 are outwardly biased (such as via spring 211) or otherwise compressible. Retaining projection 207 is disposed within a recess 213 in seat bottom panel 130 in a bed floor closed condition (see FIGS. 6 and 9). Retaining projection 209 is disposed within a recess 215 in seat back panel 132 in a bed floor closed condition. The retaining projections prevent floor panels 130 and 132 from easily shifting position in a floor closed condition. However, retaining projections 207 and 209 are designed such that applying a force to lever 200 can overcome the outward bias, causing retraction or compression of the projections and allowing rearward travel of the lever 200 and freeing of floor panels 130 and 132.

After seat back panel 132 is at least generally vertically oriented, seat bottom panel 130 can be moved into a suitable position to cooperate with seat back panel 132 to form seat 135 (see FIGS. 4, 5, 7 and 10). Seat bottom panel 130 can be, for example, rotated around a pivot formed between seat bottom panel 130 rearward edge 219 and frame 222 or retained in a channel on frame 222 suitable for sliding rearwardly into engagement with seat back panel 132. Flipping of seat bottom panel 130 may provide the benefit of exposing a suitably contoured seating surface which is stored below the load-carrying platform 112 in a floor closed condition. Seat back panel 132 can have a similar ergonomic contoured surface opposed to its cargo support side.

Figure 7:
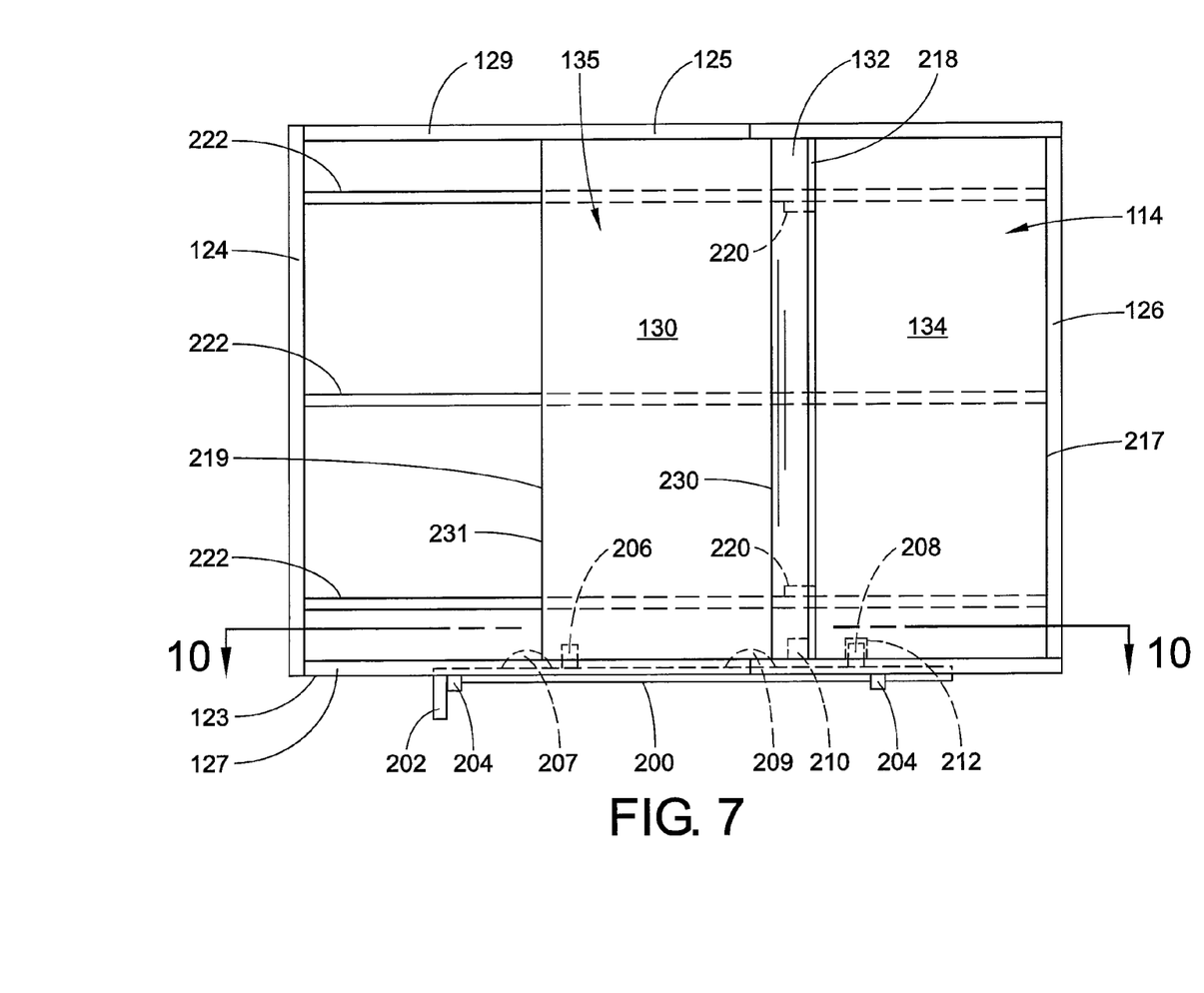
FIG. 7 is a plan view (partially in phantom) of the utility floor of FIG. 4.
Figure 8:
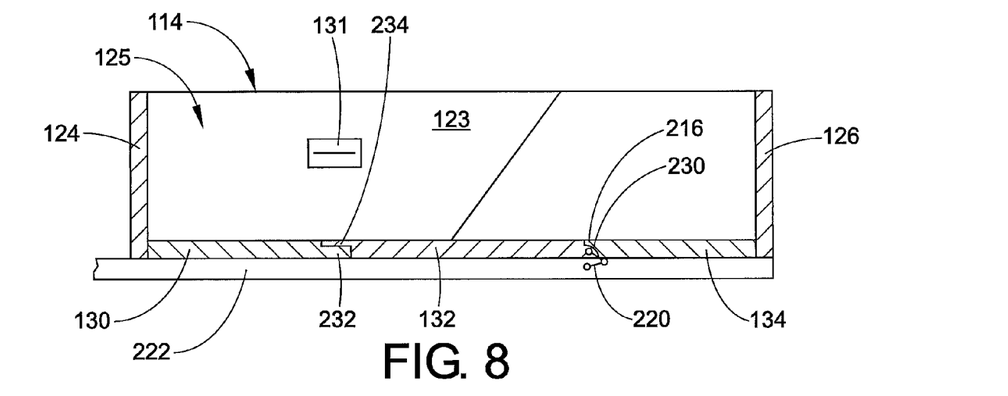
FIG. 8 is a cross section view taken along lines 8-8 of FIG. 6.
Figure 9:
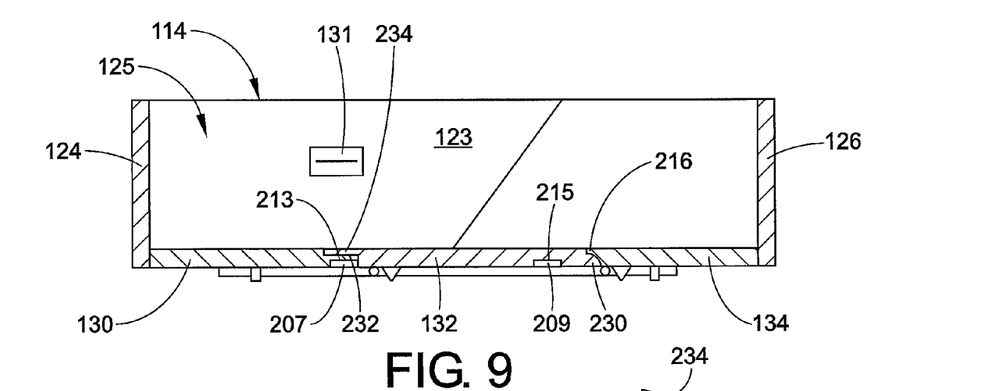
FIG. 9 is a side cross section view taken along lines 9-9 of FIG. 6.
Figure 10:
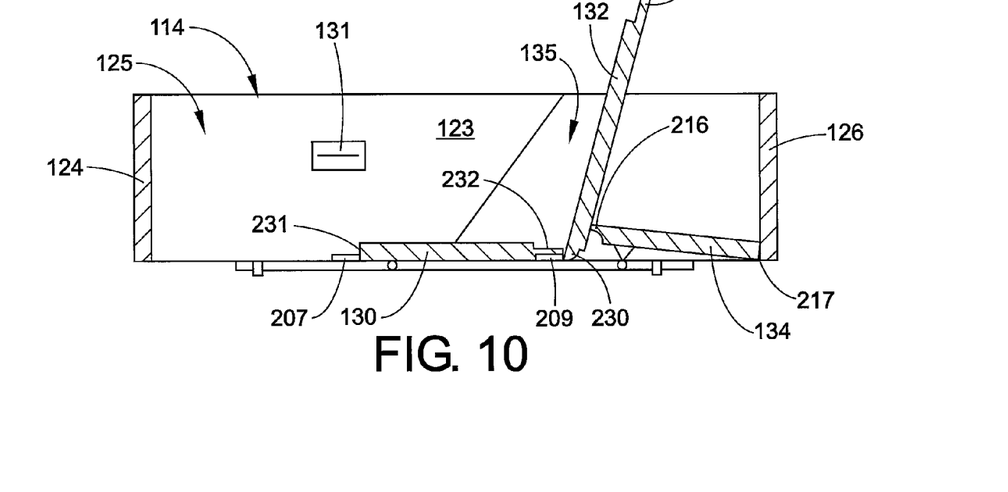
FIG. 10 is a cross section view taken along lines 10-10 of FIG. 7.
Figure 11:
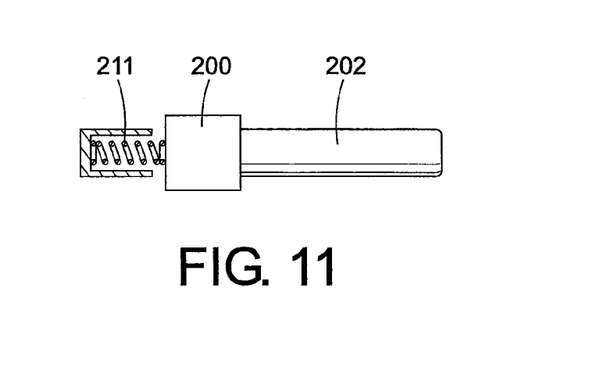
FIG. 11 is a plan view taken from the handle end of the lever.

Biased projection 207 can engage forward edge 231 of seat bottom panel 130 and biased projection 209 can engage rearward edge 230 of seat back panel 132, providing a basis for retention of the seat orientation by locking lever 200 into place.

To provide advantageous sealing of cargo surface 112, the rearward edge 230 of seat back panel 132 can underly the forward edge 216 of cover panel 134 in a floor closed condition. Similarly, the trailing rearward 232 of seat bottom panel 130 can underly forward edge 234 of seat back panel 132 in a floor closed condition. In this manner, no gaps are formed in the support surface 112 through which particulate such as dirt, sand, etc. is lost. One or more seal members and/or structures can also be provided to facilitate sealing of these junctions in a closed position, thereby further preventing dirt or debris from passing through the junctions when the cargo panels are closed.

It will be appreciated that the panels 130, 132 and 134 can be provided in any of a variety of suitable alternative arrangements. For example, panels 130 and 132 can be comprised of separate left and right sides to provide independent seats. In that regard, the activation mechanism (e.g. the lever and cam components) may be included on each of the left and right sides of the vehicle to independently operate rear left and right side seats. Furthermore, it is envisioned that the cover panel may be omitted from the design, or it could be repositioned to the front end of the utility bed relative to the seat bottom panel. Similarly, it will be appreciated that although the embodiment of FIGS. 3-10 illustrates a forward facing rear seat which is disposed towards a central portion of the utility bed, a rear facing seat(s) could be provided in the alternative. Furthermore, the seat(s) can be located on the utility bed in a more forward or rearward position than is illustrated. Similarly, a front wall of the utility bed can include left and right seat bottoms pivotable between a vertical position and a horizontal position. Alternatively, the left and right side walls may include a seat bottom(s) pivotable into a horizontal position to cooperate with a seat back formed from the bed floor. In such arrangements, the panel used to close a seat bottom aperture can be eliminated or stored remotely.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A vehicle comprising:
a utility bed including a bed floor comprised of a cover panel, a seat back panel and a seat bottom panel, said cover panel and said seat back panel each including a cam element;
a slidable lever rail including at least two cam engaging members;
wherein sliding of said lever rail raises an edge of said cover panel adjacent said seat back panel and raises an edge of said seat back panel adjacent said seat bottom panel, said raised edge of said seat back panel being rotatable to position said seat back panel in an at least generally vertical orientation; and
said seat bottom panel being movable into a seat forming relationship with said vertically oriented seat back panel.

2. The vehicle of claim 1 wherein said seat bottom panel and said seat back panel are divided into a driver side and a passenger side and wherein each side is independently convertible into a seat.

3. The vehicle of claim 1 wherein said seat back panel and said cover panel include an overlapping mating edge in a floor closed condition.

4. The vehicle of claim 1 wherein said cam elements are positioned proximate a forward edge of said panels.

5. The vehicle of claim 1 wherein said lever rail is located adjacent a side region of said seat back and cover panels.

6. The vehicle of claim 1 wherein during activation of said lever rail, the cover panel cam engaging member engages said cover panel cam element before said seat back panel cam engaging member engages said seat back panel cam element.

7. The vehicle of claim 6 wherein said cover panel cam engaging member is positioned a distance X from said cover panel cam element and said seat back panel cam engaging member is positioned a distance of at least about 3X from said seat back panel cam element in a bed floor closed condition.

8. The vehicle of claim 7 wherein said seat back panel cam engaging member is positioned a distance between about 5X and 10X from said seat back panel cam element in a bed floor closed condition.

9. The vehicle of claim 1 wherein said seat bottom panel is movable by one of sliding or rotation.

10. The vehicle of claim 3 wherein said cover panel mating edge overlaps said seat back panel mating edge in a bed floor closed condition.

11. The vehicle of claim 10 wherein said seat back panel includes an edge overlapping an edge of said seat bottom panel in a bed floor closed condition.

12. The vehicle of claim 1 wherein said seat back panel and said seat bottom panel include contoured seating surfaces on a side opposed to a side forming the bed floor in a bed floor closed condition.

13. The vehicle of claim 1 wherein said lever includes projections engaging each of said seat back panel and said seat bottom panel in a bed floor closed condition.

14. The vehicle of claim 1 wherein said lever includes projections engaging an edge of said seat back panel and an edge of said seat bottom panel in a seat deployed condition.

15. The vehicle of claim 13 wherein said projections are spring loaded or compressible.

16. An MUV including a utility bed comprising a bed floor having at least one panel, said panel being convertible between a planar storage surface and at least one passenger seat back by displacement of a lever, the lever further comprising a handle configured to initiate displacement of said lever and release of said at least one passenger seat, said lever handle being located on an exterior surface of the MUV, said lever including a first cam member cooperative with a second cam member disposed on the panel, said first and second cam members interacting to cause dislocation of the planar storage surface, and said bed floor being devoid of a latch handle.

17. The MUV of claim 16 wherein said lever handle is within arms length of said panel to facilitate rotation of said panel into said passenger seat configuration.

18. An MUV comprising:
a utility bed comprised of a bed floor including at least one panel, said panel having an at least substantially planar side and an opposed first cam element inclusive side;
a slidable lever disposed externally to said utility bed and adjacent said at least one panel, said lever including a second cam element cooperative with said first cam element to displace an edge of said panel from alignment with said bed floor;
said edge of said panel being rotatable to position said panel in an at least substantially vertical orientation.

19. The MUV of claim 18 further comprising a seat base hingedly affixed to a side wall of said utility bed, said seat base configured for rotation into association with said panel to form a seat.

20. The MUV of claim 16 wherein said utility bed further includes sidewalls and at least one sidewall includes a door.

* * * * *